Patented Apr. 8, 1952

2,592,196

UNITED STATES PATENT OFFICE 2,592,196

METHINE DYESTUFFS AND THEIR MANUFACTURE

George Schwarz, Rochester, N. Y., and Polydoor Frans De Smet, Wilrijk-Antwerp, Belgium, assignors to Gevaert Photo-Producten N. V., Mortsel-Antwerp, Belgium, a company of Belgium No Drawing. Application August 29, 1947, Serial No. 771,402. In Great Britain December 28, 1939

Section 1, Public Law 690, August 8, 1946
Patent expires December 28, 1959

5 Claims. (Cl. 260—240.1)

This invention relates to new sensitizing dyestuffs.

It is an object of the present invention to provide the manufacture of a new class of dyestuffs.

Another object is to provide these new dyestuffs.

Other objects will appear from the following description.

According to this invention methine dyestuffs are obtained by starting from compounds obtained by reacting a heterocyclic compound containing a tertiary nitrogen atom and in the alpha-position to this nitrogen atom a methyl group with a dihalogen alkylene corresponding to the formula:

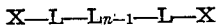

wherein:

X represents a halogen atom
n represents a positive integer of from 1 to 2
L represents a member selected from the group consisting of methylene and substituted methylene and optionally treating the products with a salt containing an acid radical other than a halogen.

The preparation of these compounds is described in our co-pending application, Ser. No. 771,401.

These starting compounds are treated with (a) condensing agents known to be used in the formation of methine dyestuffs from cycloammonium salts, or with (b) products which supply the central carbon atoms of methine dyestuffs, or with (c) intermediate products known to be used together with cycloammonium salts in the formation of methine dyestuffs in the presence of such condensing agents or (d) with aromatic aldehydes.

Examples of condensing agents as defined under (a) are acetic anhydride and triethylamine;

Examples of products which supply the central carbon atoms of methine dyestuffs as defined under (b) are: ortho-carboxyl esters, imino-esters, alkyl-esters of arylated thio-imido (U. S. P. 2,107,379), esters or salts of nitrous acid.

Examples of intermediate products as defined under (c) are: halogeno-, alkylmercapto-, aralkylmercapto-, arylmercapto-, alkylseleno-, arylseleno-, aralkylseleno derivatives or halogeno-, alkylmercapto-, aralkylmercapto-, arylmercapto-, alkylseleno-, aralkylseleno-, arylseleno-, anilino-, or acetanilido-, acetamino-, vinylene-, anilino-, or acetanilido methylene-, formyl- or thioformyl methylene-, acyl- or thioacyl methylene-, (beta-alkylmercapto-beta-alkyl) vinyl-, or (beta-substituted alkylmercapto-beta-alkyl) vinyl-, (beta-arylmercapto-beta-alkyl) vinyl-, (beta-dialkylmercapto) vinyl-, (beta-selenoalkyl-beta-alkyl-)-vinyl-, or (beta-substituted-selenoalkyl-beta-alkyl) vinyl derivatives of nitrogenous rings.

Example 1

A mixture of 3.2 g. N-ethyl-2-thio-quinoline-dimethylsulphate and 3 g. of the condensation product of 2-methyl-3:4-benzobenzthiazole and ethylene bromide is dissolved by refluxing in 30 cm.³ of dry ethyl alcohol. After the addition of 1.3 cm.³ of triethylamine the refluxing is continued during 5 minutes. The dyestuff is precipitated by the addition of ether and purified by recrystallisation from ethyl alcohol. The alcoholic solution of the dyestuff has an absorption maximum at a wave length of about 515 and a sensitizing maximum at about 540 m$\mu$ (broad).

Example 2

A mixture of 3.2 g. N-ethyl-2-thio quinoline dimethylsulphate and 2.7 g. of the condensation product of 2-methyl benzthiazole and trimethylene bromide are dissolved by refluxing in 40 cm.³ of dry ethyl alcohol. 1.3 cm.³ of triethylamine is added and the mixture boiled for about 10 minutes. The dyestuff is precipitated with ether and recrystallized from ethyl alchohol. The alcoholic solution of the dyestuff has an absorption maximum at about 490 m$\mu$. Sensitizing maximum at about 525 m$\mu$.

Example 3

2.7 g. of the condensation product of 2-methyl-benzthiazole and trimethylene bromide are dissolved in 25 cm.³ of dry pyridine and 3 cm.³ of ethylester of orthoformic acid are added. The mixture is boiled for 1 hour. On cooling, the dyestuff separates. It is purified by recrystallization from ethyl alcohol. The dyestuff shows an absorption maximum at about 565 m$\mu$ and 525 m$\mu$ in (alcoholic solution) and a sensitizing maximum at about 600 m$\mu$.

Example 4

3.2 g. of the condensation product of 2-methyl-3:4-benzobenzthiazole and trimethylene bromide are dissolved in 20 cm.³ of dry pyridine. 3 cm.³ of ethylester of otho-formic acid are added and the mixture boiled for about 1 hour. The dyestuff is precipitated with a solution of potassium bromide and recrystallized from ethyl alcohol. Absorption maximum in alcoholic solution at about 600 m$\mu$. Sensitizing maximum at about 640 m$\mu$.

Example 5

15 cm.³ dry pyridine, 5 cm.³ ethylester of orthoacetic acid and 3.2 g. of the condensation product of 2-methyl-3:4-benzobenzthiazole and trimethylene bromide are boiled for 1 hour. The dyestuff is precipitated with a solution of potassium iodide and recrystallized from ethyl alcohol. Absorption maximum in alcoholic solution at about 585 mμ. Sensitizing maximum at about 620 mμ.

Example 6

3.2 g. of 2-acetanilidovinyl-4-dimethylaminobenzthiazole ethyl iodide and 2.7 g. of the condensation product of 2-methylbenzthiazole and trimethylene bromide are dissolved in 30 cm.³ of dry pyridine and boiled for about 1 hour. After precipitation with ether the dyestuff is purified by recrystallization from ethyl alcohol. This dyestuff shows an absorption maximum at about 590 mμ (alcoholic solution) and a broad sensitizing maximum from 640 to 680 mμ.

Example 7

4.5 g. of 2-acetanilidovinylbenzthiazolethyliodide and 4.5 g. of the condensation product of 2-methyl-3:4-benzobenzthiazole and trimethylene bromide are dissolved in 30 cm.³ of dry pyridine and refluxed for a quarter of an hour. The dyestuff is precipitated with a solution of potassium iodide and recrystallized from methyl alcohol. Absorption maximum in alcoholic solution at about 575 mμ. Sensitizing maximum at about 620 mμ.

Example 8

4 g. dimethylsulphate of [N-ethyl-5:6-benzobenzthiazolidene methyl] - methylthioketone (pending British specification 141/40) and 3 g. of the condensation product of 2-methyl-3:4-benzobenzthiazole and ethylene bromide are dissolved by refluxing in 60 cm.³ of dry ethyl alcohol, 1.4 cm.³ of triethylamine are added and the mixture is boiled for 2 minutes. The dyestuff is precipitated with a solution of potassium bromide. The crude dyestuff is washed with water and alcohol. Further purification was obtained by recrystallization from ethyl alcohol. Absorption maximum at about 580 mμ. Sensitizing maximum at about 640 mμ.

Example 9

4.5 g. 2-benzoylmethylene-N-ethyl-5-methyl-1:2-dihydrothiodiazole-1:3:4- and 4 g. of the condensation product of 2:5-dimethylthiodiazole and ethylene bromide are boiled in 40 cm.³ acetic anhydride for 20 minutes. The dyestuff is precipitated with ether and next, after dissolving in alcohol, precipitated with an aqueous solution of sodium perchlorate and recrystallised from alcohol.

Example 10

4.5 g. dimethyl sulphate of 2-thio acetylmethylene-N-ethyl-1:2-dihydrobenzthiazole and 3.5 g. of the condensation product of 2-methylbenzselenazole and ethylene bromide are boiled for 2 minutes in 30 cm.³ absolute alcohol with 1.7 cm.³ triethylamine by the use of a reflux cooler. After precipitation with ether, the dyestuff is re-dissolved in alcohol and precipitated with an aqueous 10 percent KI solution and recrystallised from alcohol.

While the detailed description refers to the production of certain specific bodies, it is to be understood that the invention extends to processes for producing generally similar bodies within the scope of this specification, and to the use of such bodies in the production or treatment of photographic emulsions and to photographic materials, the emulsions of which have been sensitized with such dyestuffs.

We claim:

1. Process for the manufacture of a new methine dyestuff which comprises treating a heterocyclic compound corresponding to the formula

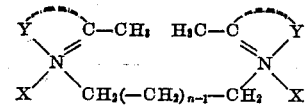

wherein:

Y represents the non-metallic atoms necessary to complete a member selected from the group consisting of 5-membered heterocyclic rings and of the same 5-membered heterocyclic rings having a fused-on arylene group, X represents an acid residue, n represents a positive integer of from 1 to 2, with a compound of the formula

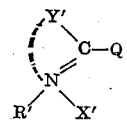

wherein:

Y' represents the non-metallic atoms necessary to complete a member selected from the group consisting of 5-membered and 6-membered heterocyclic rings and of the same 5-membered and 6-membered heterocyclic rings having a fused-on arylene group, while R' represents alkyl, X' represents an acid residue, Q represents a member selected from the group consisting of S-alkyl,

and

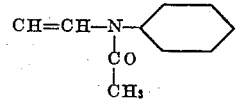

2. The dyestuff corresponding to the formula:

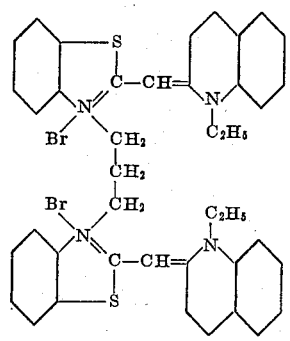

3. The dyestuff corresponding to the formula:

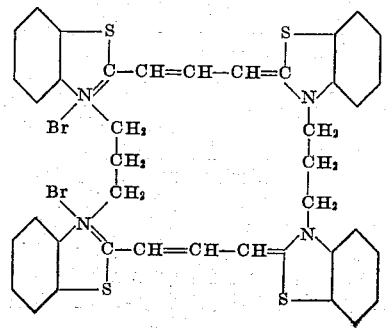

4. The dyestuff corresponding to the formula:

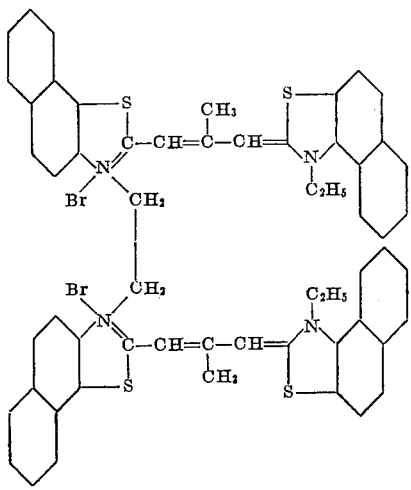

5. A bis-cyanine dye of the general formula:

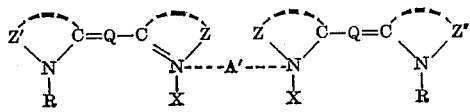

wherein Z and Z' constitute the atoms necessary to complete an azole nucleus, Q is a trivalent bridging radical of the type usual in cyanine dyes radical which forms a conjugated chain of atoms between the intracyclic nitrogen atoms of the two adjacent azole nuclei, A' is a polymethylene radical, R is a hydrocarbon radical taken from the group consisting of alkyl and aralkyl radicals, and X is the negative radical of an acid.

GEORGE SCHWARZ.
POLYDOOR FRANS DE SMET.

REFERENCES CITED

The following references are of record in the file of this patent:

UNITED STATES PATENTS

| Number | Name | Date |
|---|---|---|
| 2,418,748 | Bayley | Apr. 8, 1947 |
| 2,425,772 | Wilson | Aug. 19, 1947 |
| 2,425,773 | Wilson | Aug. 19, 1947 |
| 2,425,774 | Wilson | Aug. 19, 1947 |
| 2,465,412 | Wilson | Mar. 29, 1949 |
| 2,465,774 | Wilson | Mar. 29, 1949 |